(12) United States Patent
Livisay et al.

(10) Patent No.: US 6,576,277 B2
(45) Date of Patent: Jun. 10, 2003

(54) CALCIUM-FORTIFIED, GRAPE-BASED PRODUCTS AND METHODS FOR MAKING THEM

(75) Inventors: Stacy A. Livisay, Voorhees, NJ (US); James P. Lavoie, Billerica, MA (US)

(73) Assignee: Welch Foods, Inc., Concord, MA (US)

( * ) Notice: Subject to any disclaimer, the term of this patent is extended or adjusted under 35 U.S.C. 154(b) by 119 days.

(21) Appl. No.: 09/788,327

(22) Filed: Feb. 16, 2001

(65) Prior Publication Data

US 2002/0001642 A1 Jan. 3, 2002

Related U.S. Application Data

(60) Provisional application No. 60/183,299, filed on Feb. 17, 2000.

(51) Int. Cl.$^7$ .............................. A23L 1/304; A23L 2/02
(52) U.S. Cl. .......................................... 426/74; 426/599
(58) Field of Search .................................. 426/74, 599

(56) References Cited

U.S. PATENT DOCUMENTS

| | | | | |
|---|---|---|---|---|
| 1,915,273 A | * | 6/1933 | Eoff, Jr. ................... | 426/599 |
| 3,922,375 A | | 11/1975 | Dalan et al. .............. | 426/583 |
| 3,949,098 A | | 4/1976 | Bangert .................... | 426/324 |
| 3,958,017 A | | 5/1976 | Morse et al. ............. | 426/72 |
| 4,309,417 A | | 1/1982 | Staples .................... | 424/128 |
| 4,486,413 A | | 12/1984 | Wiesenberger et al. .. | 424/177 |
| 4,722,847 A | | 2/1988 | Heckert .................... | 426/74 |
| 4,737,367 A | | 4/1988 | Langer et al. ............ | 426/72 |
| 4,738,856 A | | 4/1988 | Clark ....................... | 426/74 |
| 4,748,034 A | | 5/1988 | de Rham ................. | 426/330.2 |
| 4,786,510 A | | 11/1988 | Nakel et al. .............. | 426/74 |
| 4,830,862 A | | 5/1989 | Braun et al. .............. | 426/74 |
| 4,871,554 A | | 10/1989 | Kalala et al. ............. | 426/74 |
| 4,891,236 A | * | 1/1990 | Ohta et al. ............... | 426/599 |
| 4,919,963 A | | 4/1990 | Heckert .................... | 426/599 |
| 4,992,282 A | | 2/1991 | Mehansho et al. ....... | 426/72 |
| 5,141,758 A | | 8/1992 | Monte ...................... | 426/72 |
| 5,225,221 A | | 7/1993 | Camden et al. .......... | 426/74 |
| 5,322,702 A | | 6/1994 | Selinger et al. .......... | 426/583 |
| 5,474,793 A | | 12/1995 | Meyer et al. ............. | 426/599 |
| 5,597,595 A | | 1/1997 | DeWille et al. .......... | 426/74 |
| 5,641,531 A | | 6/1997 | Liebrecht et al. ........ | 426/583 |
| 6,106,874 A | * | 8/2000 | Liebrecht et al. ........ | 426/74 |

FOREIGN PATENT DOCUMENTS

| | | | |
|---|---|---|---|
| EP | 0 397 232 | 4/1990 | ............ A23L/2/26 |
| EP | 0 486 425 | 10/1991 | ............ A23L/1/29 |
| GB | 1024408 | 3/1966 | ............ A23H/1/00 |
| WO | WO 93/12672 | 7/1993 | ............ A23L/2/38 |
| WO | WO 00/28838 | 5/2000 | ............ A23L/2/00 |
| WO | WO 00/53035 | 9/2000 | ............ A23L/1/304 |

OTHER PUBLICATIONS

Ashurst, P. R. 1995, Production and packaging of Non–carbonated fruit juices and fruit beverage, Blackie Academic & Professional, 2$^{nd}$ Ed., pp. 98, 99.*

* cited by examiner

*Primary Examiner*—Helen Pratt
(74) *Attorney, Agent, or Firm*—Bromberg & Sunstein LLP

(57) ABSTRACT

Methods of making a calcium fortified, tartaric acid-containing product that is essentially free of tartrate precipitates, and products made by this method. The tartaric acid concentration of a precursor is adjusted to form an adjusted precursor. An additive containing a calcium-based compound is mixed with the adjusted precursor to make the fortified product. The compound may be calcium gluconate, a variety of other compounds or mixtures thereof. The fortified product, when stored at approximately 70° F., may remain essentially free of tartrate precipitate for at least sixteen weeks.

40 Claims, No Drawings

CALCIUM-FORTIFIED, GRAPE-BASED PRODUCTS AND METHODS FOR MAKING THEM

RELATED U.S. APPLICATION(S)

This application claims priority from U. S. Provisional Application Ser. No. 60/183,299, filed Feb. 17, 2000, which is hereby incorporated herein by reference.

TECHNICAL FIELD

The embodiment relates to formulation of grape-based products such as, but not limited to, juice, juice-blended beverages, and wine containing a significant amount of bioavailable calcium as well as to processes for the manufacture of the products. The field encompasses the production, storage and distribution of stable calcium-fortified purple, red and white grape juice and juice drinks, in shelf-stable, refrigerated, frozen and concentrate forms. Beverages covered include grape-based liquids blended with non-grape liquids.

BACKGROUND ART

Calcium is an essential mineral in the human diet for the preservation of human health. Calcium has been established as a key nutrient for skeletal rigidity; it is also known to impact metabolic, muscular, neurological, circulatory, and enzymatic processes. Calcium deficiency is a contributing cause of osteoporosis, a debilitating bone disease marked by a loss of bone mass.

Calcium is naturally found in many foods. The primary source of bioavailable calcium is milk and, more generally, dairy products. As people enter early adulthood, their consumption of dairy products tends to decrease. This may lead to a state of chronic calcium deficiency. This trend is particularly found with young women and could contribute to their high rates of osteoporosis development in later life. Additionally, many people are, or become, lactose intolerant as they age, thus reducing their ability to obtain natural, traditionally rich sources of this mineral.

Therefore, many alternate sources of food, drink, and supplements are currently being fortified with various organic and inorganic calcium salts. These alternate sources include pills, powders, food products, as well as a variety of fruit and non-fruit based juices and beverages. Many plaguing problems surround the provision of organoleptic qualities and bioavailability of these calcium-fortified sources. A common complaint with respect to fortified beverages is the relative insolubility of some of the added calcium salts, intolerable precipitation of solids, and a "chalky" feeling in the mouth upon drinking. Additionally, undesirable flavors and shelf instability contribute to a poor food product.

The fortification of various liquids with calcium, including orange, apple and other juices and beverages is an art currently practiced by juice and beverage manufacturers. Patents describing calcium fortification of fruit juices include several granted to Heckert and assigned to the Proctor and Gamble Company (for example, U.S. Pat. No. 4,722,847). These patents disclose calcium-citrate-malate (CCM) technology and teach that various calcium citrate and malate compounds, when combined in accordance with disclosed processing methods, will produce stable, fortified juices containing calcium levels at least equivalent to those normally occurring in milk (i.e., 350 mg/8 fl. oz.).

U.S. Pat. No. 4,740, 380 to Melachouris et al. discloses a calcium-fortified acidic beverage formulated using various calcium sources. U.S. Pat. No. 6,106,874 to Liebrecht et al. discloses a calcium-fortified nutritional beverage, which can be made from single strength juice. Calcium sources therein are natural milk mineral and Gluconal CAL® (manufactured by Glucona America).

Calcium fortification of grape-based beverages is especially challenging. The predominant organic acid in grape-based liquid (e.g. juice, wine, etc.) is, uniquely among fruit-derived liquids, tartaric acid. At pH levels above 2.8, tartaric acid will chemically dissociate into tartrate, bitartrate and hydrogen ions. As the pH of grape juice increases, the dissociation of tartaric acid becomes progressively more favored. Across the typical pH range of about 2.8 to about 3.9 for purple, red and white grape juices from *Vitis labrusca*, *V. vinifera*, and *V. labrusca* x *V. vinifera* hybrid grapes, the availability of tartrate ions for reaction with any added calcium to form insoluble crystalline calcium tartrate, is very high. Indeed, at relatively high pH and without the presence of calcium, potassium bitartrate crystals or "argol" in juice (or "wine stones" in wine) may be formed due to the naturally occurring concentration of potassium in grape-based product. This is commonly found in winemaking and the pertinent literature is abundant in addressing ways to solve this problem.

The formation of calcium tartrate crystals in grape-based liquids is known from past research on wines. This formation is dependent, for example, on the pH of the beverage, the storage temperature of the calcium plus beverage mixture, the presence of inhibitors, the ionic strength of solution, agitation of solution, and the length of time that the mixture is held in storage. Abgueguen and Boulton, (1993); McKinnon, 1993. Formation of calcium tartrate crystals may occur instantly upon the cooling of a pasteurized juice-calcium mixture, Alternatively, crystals may not occur for a substantial period of time. However, because calcium tartrate crystals have very low solubility in aqueous solutions such as grape juice, once formed, these crystals will tend to remain as an insoluble precipitate rendering the beverage organoleptically unacceptable with significantly diminished bioavailable calcium. After initial nucleation of these crystals, they will generally grow in size until the point of solution saturation is reached.

SUMMARY OF THE INVENTION

In accordance with a first embodiment of the present invention, a method of making a fortified, tartaric acid-containing product is provided. The product is fortified with a predetermined amount of bioavailable calcium and the product is essentially free of tartrate precipitates. A tartaric acid-containing precursor is provided. The concentration of tartaric acid in the precursor may be between approximately 0.005 g per 100 mls and approximately 1.31 g per 100 mls. The precursor may be a grape-based liquid and may be derived from colored or white grapes. The predetermined amount of bioavailable calcium may be between 8% and approximately 35% of required daily intake for a human. The tartaric acid concentration of the precursor is adjusted to form an adjusted precursor. In an embodiment, the measured, adjusted tartaric acid concentration might be no greater than 0. 17g per 100 mls. An additive comprising a calcium-based compound is mixed with the adjusted precursor to make the fortified product. The compound may be calcium gluconate, a variety of other compounds or mixtures thereof. The fortified product, when stored at approximately 70° F. may remain essentially free of tartrate precipitate for at least sixteen weeks.

In other embodiments, fortified, tartaric acid-containing products processed by the methods described above are provided.

In a further embodiment, another method of making a fortified, tartaric acid-containing product is provided. In this embodiment, the precursor has between approximately 0.005 g per 100 mls and approximately 0.26 g per 100 mls of tartaric acid. The precursor is mixed with a predetermined amount of calcium gluconate. The bioavailable calcium in the resulting product is no more than approximately 20% of required daily intake of calcium for a human. In further embodiments, the resulting product is provided.

The adjusted precursor may be formed by adding a second precursor to a liquid tartaric acid-containing precursor. The second precursor may be single strength juice. Water may alternatively be added during adjustment; the adjusted tartaric acid concentration might be no greater than approximately 0.08 g per 100 mls. The calcium-based compound may be calcium lactate.

In yet another embodiment, a method is provided to make a fortified, tartaric acid-containing product with bioavailable calcium in an amount equaling approximately 35% of required daily intake for a human. The tartaric acid concentration of a precursor derived from colored grapes is adjusted to form an adjusted precursor and calcium gluconate is mixed with the adjusted precursor.

In yet another embodiment, a method is provided to make a fortified, tartaric acid-containing product with bioavailable calcium in an amount equaling between approximately 8% and approximately 35% of required daily intake for a human. The tartaric acid concentration of a precursor derived from white grapes is adjusted to form an adjusted precursor and calcium lactate is mixed with the adjusted precursor.

Still other embodiments provide product made by both of the latter embodiments.

DETAILED DESCRIPTION OF SPECIFIC EMBODIMENTS

As noted previously, pH, storage temperature, presence of inhibitors and solution storage time all contribute to calcium tartrate crystal formation in grape-based beverages and liquids. Embodiments of the present invention detailing methods of making fortified grape-based products and the products themselves are based, upon the need to control tartaric acid concentration, the amount and source of calcium-based additive, and the presence of sequestrants. Understanding the inter-relationships between the many factors are important in creating a calcium-fortified product containing juice or other derivative components of grapes.

As used in the specification and appended claims, the term "beverage," "juice," and "liquid" are all being used interchangeably and refer to any commonly available juice-type product which includes, but is not limited to, single strength (abbreviated SS), ready-to-drink products, concentrates (frozen and shelf-stable), cocktails and the like. As used herein, "single strength" refers to a juice, which has an approximate Brix value that is required by its standard of identity (which is based on 21 CFR 101.30). As used herein, "precursor" usually refers to a natural fruit source of tartaric acid but may be any tartaric acid-containing starting material intended to be calcium-fortified. As used herein, "stable" and "shelf-stable" are used essentially interchangeably and refer to a product which can maintain organoleptic and nutritional quality (including maintaining the bioavailability of calcium) for an extended time period. This period may, but is not limited to, a total time of processing, warehousing, shipping, retailing, and "at consumer" storage. This total time is generally, but not limited to, about 26–52 weeks.

Embodiments are dependent on providing a tartaric acid-containing precursor. Such precursors are the components of concern due to the likelihood of the adverse formation of tartrate precipitates. Content and/or availability of the tartaric acid must be measured and adjusted accordingly (if necessary) to attain a level which would not succumb, with the introduction of a calcium-based additive, to calcium tartrate crystal formation in a final, fortified product.

Precursors are, generally, but not necessarily, derived from grapes. Tartaric acid is relatively uncommon in nature although it is considered to be characteristic of grapes (Hulme, 1970; Nagy and Shaw, 1980). This acid is either not found or found only in trace amounts in apple, apricot, banana, blackberry, boysenberry, cherry, cranberry, grapefruit, lemon, lime, orange, passion fruit, peach, pear, red raspberry, strawberry, tangerine, or tomato varieties (Nagy and Wade, 1995). However, it sometimes appears in avocado (0.020% in tissue), mulberry, tamarind, raspberry, grapefruit (0.0003–0.0007%), or mango (Jacobs, 1951; Hulme, 1970). The natural concentration of tartaric acid in grape juice varies with grape species, variety, viticultural practices, geographic location of grape vineyards, limatic conditions, grape maturity, and the particular methods of juice processing. Grape varieties are usually classified in 3 very broad color classes. These are white, red and black (Winkler et al., 1974). As used in the specification and appended claims, the term "colored grape" will not refer to the broad class of "white" grape. From these broad classes, further distinctions are made to denote green, blue and purple grapes. The coloring of the red, blue, purple and black grapes are all attributed to anthocyanin pigments, which are modified to contain a glucose molecule (Winkler et al., 1974). Tartaric levels have been reported in the past to be nearly identical (i.e. 0.39–0.67 g/100 mls) for both white grapes and red Concord grapes (Nagy and Wade, 1995). However, there has generally been a distinction found with white grapes (e.g. Aurore, Delaware, and Niagara) that have significantly lower tartaric levels than do colored grapes (e.g. Catawba, Concord, Ives and Baco noir). These white grapes range in tartaric acid,level from 0.34–0.91 g/100 mls while the colored grapes range from 0.48–1.31 g/100 mls (Gould, 1974). The range of tartaric acid levels for grape juices prepared from the *V. labrusca* species, in particular, Concord, and for *V. labrusca* x *V. vinifera* hybrids, in particular, the variety Niagara, is typically 0.40 g/100 mls to 0.80 g/100 mls [Historical References, Welch's files].

To further differentiate the various categories of grape-based products, so-called clarified grape juices are likely to be less stable with respect to deleterious calcium tartrate formation than would non-clarified juices. As part of clarification procedure, pectin is almost completely digested by enzymes. Pectin is known to bind calcium; this can specifically be seen with diet or low calorie jams and jellies for which calcium is added to increase pectin-binding thereby making a gel. Additionally, it has long been a nutritional concern as to the bioavailability of calcium in high fiber diets (for which pectin can be a known component) due to this known binding of ionic minerals. Thus, it is apparent that the effective elimination of pectin (i.e. in clarified juices) would lead to a precursor with which any added calcium would be even more likely to result in calcium tartrate formation (Tressler and Joselyn, 1961).

The presence of tartaric acid causes the formation of tartrate crystals in the presence of cationic species. Referring now to Table 1, this can be seen in the 100% juice blends. Calcium tartrate crystals formed no matter what calcium source was used as an additive at tartaric acid levels of 0.21 g/100 mls or greater under storage conditions of 70° F., with the desired amount of bioavailable calcium being 35% RDI. Thus, the natural concentrations of tartaric acid found in the precursors may, of necessity, need adjustment, in order to yield stable, non-crystal forming fortified products.

In Table 1, tartaric acid concentrations were adjusted to given measured values of tartaric acid by using different ratios of two precursors, namely, single strength grape juice (SS) and grape juice from concentrate (except for the 0.08 g/100 mls adjusted level which utilized 54% apple concentrate having 0% tartaric acid). Different juice sources may be used to target specific final concentrations of tartaric acid through proper blending. Before the samples were established, initial tartaric acid concentrations were determined by High Performance Liquid Chromatography (HPLC) for the juice types (according to AOAC #986.13). From this, required levels of each precursor were determined to attain a desired, adjusted concentration of tartaric acid to which calcium would be added (blending ratios are shown within the table). For desired tartaric acid concentrations less than 0.17 g/100 mls of 100% juice product, blending with a non-grape juice containing low or negligible tartaric levels was performed, as is shown in Table 1 for 0.08% tartaric acid (apple juice from concentrate was used). After blending, the targeted values of tartaric acid were confirmed with HPLC analysis. After blending, targeted values of tartaric acid were confirmed with HPLC analysis. It should be pointed out that in measuring tartaric acid levels of the blend, the measurements were made on the adjusted precursor rather than on the final product. These precursors contained all of the components of the final product except for the calcium additive. This was done to obtain precise tartaric acid levels that are in solution without complications caused by calcium tartrate formation and the potential loss of tartaric acid solution concentration. Allowances were made for dilution of adjusted precursor based on addition of calcium additive in its own, typically aqueous, carrier.

TABLE 1

100% Juice Blends from different precursors-all grape unless specified;
(measured tartaric acid concentrations)

| Calcium source (35% RDI) | 46% conc. Grape/ 54% conc. Apple (0.08 g/100 mls) | 100% from concentrate (0.17 g/100 mls) | 6% SS juice/ 94% conc. (0.21 g/100 mls) | 14% SS juice/ 86% conc. (0.26 g/100 mls) | 20% SS juice/ 80% conc. (0.30 g/100 mls) |
|---|---|---|---|---|---|
| Calcium lactate | Stable 7 weeks | crystals 2 weeks | crystals 2 weeks | crystals 2 weeks | du |
| Gluconate:lactate 60:40 | du | Stable 7 weeks | crystals 6 weeks | Du | crystals 4 weeks |
| Gluconate:lactate 80:20 | du | du | crystals 8 weeks | Du | crystals 4 weeks |
| Gluconal CAL ® | Stable 16 weeks | Stable 16 weeks | crystals 11 weeks | crystals 7 weeks | crystals 3 weeks |
| Calcium gluconate | Stable 9 weeks | du | crystals 12 weeks | crystals 7 weeks | du |
| CCM | Stable 7 weeks | crystals 4 weeks | crystals 1 week | crystals 1 week | crystals 1 week |

Note:
du = "data unavailable." Measured concentrations of precursor tartaric equal ~0.80 g/100 mls for SS Grape juice; ~0.17 g/100 mls for Concord grape concentrate; and ~0 g/100 mls for apple concentrate. All values given for 70° F. storage.

Tartaric acid content of the precursor may be adjusted by various techniques, in accordance with various embodiments, to form an adjusted precursor. The concentration of single strength juices is one approach. This technique may also enhance the likelihood of natural potassium, bitartrate formation which is then removed prior to reconstitution. Grape juice, in particular, juice derived from V. labrusca and V. labrusca x V. vinifera hybrid species that has been concentrated and then reconstituted to single strength contains approximately 75% less tartaric acid, or from approximately 0.10 g/100 mls to 0.18 g/100 mls [Historical References, Welch's files]. An alternate technique would be to raise the pH of the precursor by adding a base. This would similarly allow for greater tartrate ion formation and increased reactivity with naturally occurring potassium. The pH of grape juice derived from Concord and Niagara varieties is typically 2.8–3.7; increases in pH from these values will promote increased potassium tartrate formation. In addition to increased pH, the choice of base may also play a role. A base may be chosen from any source having a known affinity for tartrate ions and a relatively poor solubility with regard to the resultant salt formation. Temperature reductions are also known to be useful in precipitating out tartaric acid. A reduction in temperature can reduce solubility of tartrate salts and has been used in the past, for example, in the wine industry for cold stabilization testing. Freezing can also dramatically reduce tartaric acid levels by increasing crystal formation kinetics; thus freeze-concentration would also be a viable technique. Furthermore, reduction of tartaric acid may also be achieved via chromatographic techniques including, but not limited to, ion-exchange chromatography. A further embodiment of possible tartaric acid concentration adjustment would simply be mixing different sources of grape-based liquids (e.g. colored and "uncolored/white") or mixing grape with non-grape liquids (including other fruit juices, water, etc.). The following are illustrative examples (in no way limiting) of non-grape juices which this embodiment would cover: orange, apple, pear, cranberry and other berry fruits; and tropical and exotic fruits. The adjustment of tartaric acid in the precursor may be achieved by any of the above techniques or combinations thereof, in addition to any other technique known in the art.

In addition to tartaric acid concentration of the precursor, the particular calcium additive affects the final amount of bioavailable (in solution) calcium in the resulting fortified product. Not being bound by a particular theory, some stability for calcium retention (as opposed to precipitation as tartrate) can seemingly result from a preference for calcium to bind with a given sequestrant over the calcium binding with tartrate ions already in solution. The data in Table 1 shows that use of calcium gluconate in the additive leads to greater retention of solubility and bioavailability of calcium when compared with other additives. By way of example, at tartaric acid concentration of 0.21 g/100 mls, products (with intended 35% RDI calcium) made with all of the tested calcium additives (namely, pure calcium gluconate, pure calcium lactate, ratios of gluconate to lactate, a specific commercial mixture, Gluconal CAL® ((which consists of a proprietary mixture of calcium gluconate and calcium lactate)), marketed by Glucona America ((Madison, Wis.)), and CCM) and stored at 70° F., exhibited calcium tartrate crystal formation. It took 11 and 12 weeks, respectively, for product made with Gluconal CAL® and with pure calcium gluconate to reveal precipitates. Product made with CCM exhibited precipitation in only one week; product made with pure calcium lactate showed crystal growth in only two weeks. Given results to date, the stability over time was shown to increase with calcium gluconate additive content for intended 35% RDI product. (Note: Reading down the rows of Table 1 reveals data for increasing percentage amounts of gluconate additive, except for final row showing CCM result). For lower tartaric acid concentration precursors of 0.08 g/100 mls and of 0.17 g/100 mls, product made with any additive containing calcium gluconate shows no precipitation for at least seven weeks. It should be noted that other, as yet untested, calcium sources may also provide acceptable levels of bioavailable calcium without tartrate precipitation at these tartaric acid levels. These may include calcium carbonate, calcium oxide, calcium orthophosphates, calcium glubionate, calcium gluceptate, calcium levulinate, calcium lactophosphate, calcium chloride, and mixtures thereof. Calcium lactate and, for example, calcium citrate and calcium malate, may be acceptable additives but only at either significantly reduced levels of tartaric acid concentration in the precursor or at lower than 35% RDI intended product.

The pH also plays a critical role in facilitating tartrate crystal formation by increasing the concentration of available tartrate ions. Although not shown in Table 1, all juices had a non-adjusted pH of 3.0–4.0 (typically, 3.5). The pH should be as low as possible to increase the bioavailability of the calcium source but not to minimize the organoleptic qualities (e.g. too much sourness in low pH beverages). The juices were not adjusted due to these organoleptic requirements.

Aside from levels of tartaric acid and source of calcium, the amount of calcium also plays a contributing role. Calcium concentrations were measured and confirmed in the product using Atomic Absorption spectroscopy (AA). In contrast with the finding that all tested calcium additives led to calcium tartrate crystallization at 35% RDI and 0.21 g/100 mls tartaric acid concentration (see Table 1), products fortified at 20% RDI and lower have shown stability, to date, with calcium gluconate as additive at this tartaric concentration (see Table 2). Fortified products made with Gluconal CAL® also showed stability to crystallization for 0.30 g tartaric/100 mls at 10% RDI and lower (see Table 2). Thus, higher concentrations of tartaric acid in the fortified products can be tolerated provided that the amount of the calcium additive (the desired bioavailable calcium level) is lowered to well below 35% RDI.

Table 2 also shows results for products made with Gluconal CAL® and CCM technology at 35% RDI and 0.26 g tartaric/100 mls for 100% juice blends of apple and grape. Results are similar to those of Table 1 in that no calcium additive at 35% RDI can remain stable at 0.26 g tartaric/100 mls. However, note that Gluconal CAL® has a greater retention to stability than does CCM. Another comparison is shown in Table 2 for products with 100% juice blends of concord and white grape juice at 35% RDI. Products with CCM eventually form calcium bitartrate crystals at 39 weeks for 0.15 g Tartaric/100 mls. However, no precipitation is apparent for 99 weeks at this tartaric level using Gluconal CAL® as the additive. Table 2 also shows stability data for juice cocktail products formulated with only 0.07 g tartaric/100 mls which remain stable to crystal formation for both Gluconal CAL® and calcium lactate. At this very reduced tartaric acid level, economics may play a role in determining which additive to use. Calcium lactate is a very inexpensive additive.

TABLE 2

| Fortified Product | % RDI | g Tartaric/ 100 mls | Calcium tartrate formation results |
|---|---|---|---|
| 100% grape juice w/Calcium gluconate | 35% | 0.21 | Crystals 12 weeks |
| 100% grape juice w/Calcium gluconate | 20% | 0.21 | Stable 8 weeks |
| 100% grape juice w/Calcium gluconate | 10% | 0.21 | Stable 8 weeks |
| 100% grape juice w/Calcium gluconate | 8% | 0.21 | Stable 8 weeks |
| 100% grape juice w/Gluconal CAL ® | 35% | 0.30 | Crystals 2 weeks |
| 100% grape juice w/Gluconal CAL ® | 20% | 0.30 | Crystals 4 weeks |
| 100% grape juice w/Gluconal CAL ® | 10% | 0.30 | Stable 17 weeks |
| 100% grape juice w/Gluconal CAL ® | 8% | 0.30 | Stable 17 weeks |
| 100% grape/apple juice blend w/Gluconal CAL ® | 35% | 0.26 | Crystals 8 weeks |
| 100% grape/apple juice blend w/CCM technology | 35% | 0.26 | Crystals 1 week |
| 30% white grape cocktail w/ Gluconal CAL ® | 35% | 0.07 | Stable 26 weeks |
| 30% white grape cocktail w/calcium lactate | 35% | 0.07 | Stable 26 weeks |
| 100% Concord and white grape blend w/ Gluconal CAL ® | 35% | 0.15 | Stable 52 weeks |
| 100% Concord and white grape blend w/CCM | 35% | 0.15 | Crystals 39 weeks |

Note:
all values given for 70° F. storage.

Batch processing for manufacture of calcium-fortified grape liquids has been performed under four distinct conditions. These particular processing runs are detailed below.

Batch Process A: A one gallon aqueous batch of calcium gluconate additive was prepared by dispersing 63.17 g of calcium gluconate (monohydrate) into 2673.2 g of water. 252.6 g of SS Concord grape juice (15.3 Brix) was blended separately with 1059.1 g of Concord concentrate (57.2 Brix), to adjust the tartaric acid level of the SS juice. 2.15 g of ascorbic acid was also added. The calcium gluconate aqueous solution was added to the fruit juice solution under rapid mixing. After mixing, samples were bottled in 16 oz. glass bottles and heated in bottles to 195° F. to pasteurize. After pasteurization, Brix, titratable acidity, pH, % tartaric acid (measured with HPLC) and % calcium (measured with AA) were measured. Results were 17.5 Brix, pH 3.6, 0.52% titratable acidity (as citrate), 0.21 g tartaric/100 mls, and 350 mg/8 ounces calcium. Samples were stored in a 70° F. chamber and weekly visual inspection was done to observe for any crystal formation. Additionally, monthly samplings were performed for Brix, titratable acidity, pH, sensory, and filtering (specifically for tartrate crystals).

Batch Process B: A plant scale, batch process experiment was done using Gluconal CAL®. Components include:

a) Welch's Concord grape juice concentrate—*V. labrusca* (Brix at 57.0° to 68.0° and tartaric acid at 0.10 g/100 ml as single strength juice).

b) White grape juice concentrate—*V. vinifera* (Brix at 57.0° to 68.0° as a concentrate and tartaric acid at 0.9 g/100 ml to 0.24 g/100 ml as single strength from concentrate was obtained from Canandaigua (Madera, Calif.)).

c) 1.14% (w/w) solubilized Gluconal CAL® from Glucona America (Madison, Wis.).

d) Brix of 4° to 25° preferably 12° to 20.

e) water.

The sequence of addition during product batching, filtration, heat processing, filling and cooling particular to this embodiment involve specific methodology. Prior to batching the grape juice, a 25% aqueous solution of Gluconal CAL® was prepared. Note that calcium gluconate may have been used alone but would, due to limited solubility, have required a lower aqueous concentration. For this batch, approximately 158.9 lbs. of water at 125° F.–135° F. was added to a 55-gallon mixing vessel. The water was agitated using a high speed mixer ($\geq$3600 rpm) prior to the addition of the calcium-based additive. About 52.9 lbs. of Gluconal CAL® was rapidly added (in less than 1 minute) to the 55 gallon vessel. The solution was allowed to mix for at least 2 minutes. Brix was measured and determined at 25.0% to 25.3%. The final weight of the solution was approximately 211.8 lbs. For a 1200-gallon batch, the following amounts of ingredients were required; 2055 lbs. of Concord grape juice concentrate, 875 lbs. or white grape juice concentrate, 512 lbs. of 25% Gluconal CAL®, 2304 grams of ascorbic acid, 18 lbs. of citric acid and 7231 lbs. of filtered water. The juice was batched in the following order of addition: concentrate, calcium solution, filtered water, citric acid arid ascorbic acid. The batch was allowed to mix with slow to moderate agitation for 15–30 minutes prior to measuring Brix and titratable acidity. The batch was adjusted with water and acid to meet product targets for Brix (17.4±0.3) and titratable acidity (0.58±0.02 g/100 g).

To obtain maximum clarity, the juice was filtered through a pressure leaf filter that has been pre-coated with a sufficient amount of diatomaceous earth filter cel. Each leaf of the filter contains at least ⅛" coating of filter cel. The grade of cel was JM503, FW20, Dicalite Speedex or equivalent. The juice was polish filtered through a plate and frame filter using JM503, FW20, Dicalite Speedex, or equivalent as the filter aid. The product was recycled until the filtrate was 100% free of any filter aid or other sediment.

The filtered juice product was pumped through a plate heat exchanger at a flow rate of 144 gallons per minute and heated to a temperature of 180° F. The product was held for 14 seconds and then filled into 64 fl. oz. PET bottles. After filling, the product was transferred to a cooling tunnel and cooled to a temperature of 105° F.

The result of this method is a 100% grape juice, which contains added optional ingredients (e.g. ascorbic acid for vitamin C and citric acid for tartness). It is calcium fortified at 300 mg/8 fl. oz. serving (or 30% RDI).

Batch Process C: Calcium lactate was used to fortify white grape juice cocktail using the following components:

a) 10–30% White grape concentrate.

b) 0–20% Single strength, clarified Niagara grape juice c) Brix of 4° to 25° preferably 12° to 20° d) 0.24% to 1.07% (w/w) solubilized calcium lactate (i.e. 8 to 35% RDI)

e) 2–10% 42F corn syrup f) 1–8% sugar g) citric acid, ascorbic acid, and sodium citrate as necessary to adjust flavor and nutrition (generally <1% each)

h) water

Calcium lactate was significantly less stable with tartaric acid concentrations than calcium gluconate. Thus, a much lower tartaric acid concentration had to be achieved. This was accomplished by utilizing white grape concentrate and single strength clarified Niagara grape juice, which would yield 0.07 g/100 mls tartaric acid at 30% juice. Typical tartaric acid concentration for white concentrate is 0.097 g/100 mls while SS white grape juice has 0.4 g/100 mls. For a 15 gallon batch, a base was prepared consisting of 6.73 kg SS Niagara, 3.09 kg white grape concentrate, 3.50 kg 42F corn syrup, 2.74 kg sugar, 194.1 g citric acid, 22.5 g sodium citrate and 2 kg water. This base was then diluted with 41.16 kg of water and then 27.2 g of ascorbic acid and 612.3 g of calcium lactate were added and mixed thoroughly. Target juice parameters were 0.07 g/100 mls tartaric acid and 350 mg Calcium/8 ounce servings.

Samples were stored at 32°, 70°, and 90° F. for 26 weeks with no visible calcium tartrate formation.

Batch Process D: Gluconal CAL® was used to fortify a blend of apple and grape juice utilizing the following components:

a) 5–46% Basic grape concentrate b) 54–95% apple concentrate c) Brix of 4° to 25° preferably 12° to 20° d) 0.24% to 1.07% (w/w) solubilized Gluconal CAL® (i.e. 8 to 35% RDI)

e) water

Tartaric acid would only be 0.08 g/100 mls with 100% juice by this formulation. This is due to basic concentrate having approximately 0.17 g/100 mls tartaric acid and 46% of this component would yield 0.08 g/100 mls tartaric. Apple concentrate has negligible to zero tartaric acid thus 0.08 g/100 mls would be the amount in a 100% juice blend at these ratios.

One gallon batches were prepared by dispersing 52.76 g of Gluconal CAL® into 200 g of water. 518.3 g of SS Concord grape juice (57.2 Brix) were blended separately with 349.1 g of apple concentrate (70.3 Brix); and 2884.9 g water and 2.15 g of ascorbic acid were added. The Gluconal CAL® aqueous solution was added to the fruit juice solution under rapid mixing. After mixing, samples were bottled in 16 oz. glass bottles and heated in bottles to 185° F. to pasteurize. After pasteurization, Brix, titratable acidity, pH, % tartaric acid (HPLC) and % calcium (AA) were all measured. Results were 14.1 Brix, pH 3.6, 0.48% titratable acidity (as citrate), 0.08 g tartaric/100 mls, and 350 mg/8 ounces calcium. Samples were stored in a 70° F. chamber and weekly visual inspection was done to observe for any crystal formation.

Although the invention has been described with reference to several embodiments, it will be understood by one of ordinary skill in the art that various modifications can be made without departing from the spirit and the scope of the invention, as set forth in the claims hereinbelow.

We claim:

1. A method of making a calcium-fortified, tartaric acid-containing product, the method comprising:

providing a tartaric acid-containing precursor;

adjusting tartaric add concentration of the precursor to form an adjusted precursor; having an adjusted tartaric acid concentration no greater than 0.30 g/100 mls; and mixing the adjusted precursor with an additive, the additive comprising:

a calcium-based compound, to provide a product fortified with a predetermined amount of bioavailable calcium and essentially free of tartrate precipitates.

2. A method according to claim 1 wherein, in providing, the tartaric acid-containing precursor is a liquid.

3. A method according to claim 2 wherein, in providing, the tartaric acid-containing precursor is a grape-based liquid.

4. A method according to claim 2 wherein, in adjusting, the adjusted precursor is formed by adding a second precursor to the liquid tartaric acid-containing precursor.

5. A method according to claim 4 wherein, in adjusting, the second precursor is single strength grape juice.

6. A method according to claim 5 wherein, in adjusting, the second precursor is single strength white grape juice and the liquid tartaric acid-containing precursor is white grape concentrate.

7. A method according to claim 6 wherein, in adjusting, the adjusted precursor has a measured, adjusted tartaric acid concentration and, in adjusting, water is added so that the measured, adjusted tartaric acid concentration is no greater than approximately 0.08 g per 100 mls.

8. A method according to claim 7 wherein, in mixing, the calcium-based compound is selected from calcium gluconate, calcium carbonate, calcium oxide, calcium orthophosphate, calcium gluboionate, calcium lactate, calcium gluceptate, calcium levulinate, calcium lactophosphate, calcium citrate, calcium chloride, calcium malate, calcium phosphate, calcium disodium EDTA, and combinations thereof.

9. A method according to claim 8 wherein, in mixing, the calcium-based compound is selected from calcium gluconate, calcium lactate, and combinations thereof.

10. A method according to claim 9 wherein, in mixing, the calcium-based compound is calcium lactate.

11. A fortified, tartaric acid-containing product processed according to claim 10.

12. A fortified, tartaric acid-containing product processed according to claim 9.

13. A fortified, tartaric acid-containing product processed according to claim 4.

14. A method according to claim 1 wherein, in providing, the tartaric acid-containing precursor is derived from colored grapes.

15. A method according to claim 14 wherein the predetermined amount corresponds to at least 8% of required daily intake for a human.

16. A method according to claim 15 wherein, in adjusting, the adjusted precursor has a measured, adjusted tartaric acid concentration, the measured, adjusted tartaric acid concentration being no greater than 0.17 g per 100 mls.

17. A method according to claim 16, wherein the calcium-based compound comprises calcium gluconate.

18. A method according to claim 17 wherein the product, when stored at a temperature of approximately 70° F., remains essentially free of tartrate precipitate for at least sixteen weeks.

19. A fortified, tartaric acid-containing product processed according to claim 17.

20. A method according to claim 1 wherein the predetermined amount corresponds to at least 8% of required daily intake for a human.

21. A method according to claim 20 wherein the predetermined amount corresponds to approximately 35% of required daily intake for a human.

22. A method according to claim 21 wherein, in adjusting, the adjusted precursor has a measured, adjusted tartaric acid concentration, the measured, adjusted tartaric acid concentration being no greater than 0.17 g per 100 mls.

23. A method according to claim 22 wherein, in mixing, the calcium-based compound comprises calcium gluconate.

24. A method according to claim 23 wherein the product, when stored at a temperature of approximately 70° F., remains essentially free of tartrate precipitate for at least sixteen weeks.

25. A fortified, tartaric acid-containing product processed according to claim 23.

26. A fortified, tartaric acid-containing product processed according to claim 22.

27. A method according to claim 1 wherein, in mixing, the calcium-based compound is selected from the group consisting of calcium gluconate, calcium carbonate, calcium oxide, calcium orthophosphate, calcium glubionate, calcium lactate, calcium gluceptate, calcium levulinate, calcium lactophosphate, calcium citrate, calcium chloride, calcium malate, calcium phosphate, calcium disodium EDTA, and combinations thereof.

28. A method according to claim 27 wherein, in mixing, the calcium-based compound is selected from calcium gluconate, calcium lactate, and combinations thereof.

29. A method according to claim 28 wherein, in mixing, the calcium-based compound is calcium gluconate.

30. A fortified, tartaric acid-containing product processed according to claim 1.

31. A method of making a fortified, tartaric acid-containing product comprising:

providing a tartaric acid-containing precursor, the precursor comprising between approximately 0.005 g per 100 mls and approximately 0.26 g per 100 mls of tartaric acid, and mixing the precursor with a predetermined amount of an additive, the additive comprising:
calcium gluconate;

such that bioavailable calcium in the product is no more than approximately 20% of required daily intake of calcium for a human.

32. A method according to claim 31 wherein, in providing, the precursor is a liquid.

33. A method according to claim 32 wherein, in providing, the precursor is a grape-based liquid.

34. A method according to claim 31 wherein, in providing, the precursor is derived from colored grapes.

35. A fortified, tartaric acid-containing product processed according to claim 31.

36. A method of making a fortified, tartaric acid-containing product, the product fortified with bioavailable calcium in an amount equaling approximately 35% of required daily intake for a human, the product essentially free of tartrate precipitates, the method comprising:

providing a tartaric acid-containing precursor derived from colored grapes;

adjusting tartaric acid concentration of the precursor to form an adjusted precursor having an adjusted tartaric acid concentration no greater than 0.30 g/100 mls and mixing the adjusted precursor with an additive, the additive comprising:
calcium gluconate.

37. A method according to claim 36 wherein, in adjusting, the adjusted precursor has a measured, adjusted tartaric acid concentration, the measured, adjusted tartaric acid concentration being no greater than 0.17 g per 100 mls.

38. A fortified, tartaric acid-containing product processed according to claim 36.

39. A method of making a fortified, tartaric acid-containing product, the product fortified with bioavailable calcium in a predetermined amount equaling between approximately 8% and approximately 35% of required daily intake for a human, the product essentially free of tartrate precipitates, the method comprising:

providing a tartaric acid-containing precursor derived from white grapes;

adjusting tartaric acid concentration of the precursor to form an adjusted precursor, the adjusted precursor having a measured, adjusted tartaric acid concentration, the measured, adjusted tartaric acid concentration being no greater than 0.08,g per 100 mls; and mixing the adjusted precursor with an additive, the additive comprising:

calcium lactate.

40. A fortified, tartaric acid-containing product processed according to claim 39.

* * * * *

UNITED STATES PATENT AND TRADEMARK OFFICE
CERTIFICATE OF CORRECTION

PATENT NO.    : 6,576,277 B2
DATED         : June 10, 2003
INVENTOR(S)   : Stacy A. Livisay et al.

It is certified that error appears in the above-identified patent and that said Letters Patent is hereby corrected as shown below:

Column 10,
Line 60, replace "add" with -- acid --.

Column 11,
Line 20, replace "from calcium" with -- from the group consisting of calcium --.

Signed and Sealed this

Eleventh Day of November, 2003

JAMES E. ROGAN
*Director of the United States Patent and Trademark Office*